(12) United States Patent
Ramle et al.

(10) Patent No.: US 11,641,577 B2
(45) Date of Patent: *May 2, 2023

(54) ALLOCATION OF ALLOWED REGISTERED AREA

(71) Applicant: Telefonaktiebolaget LM Ericsson (publ), Stockholm (SE)

(72) Inventors: Peter Ramle, Mölnlycke (SE); Josefin Karlsson, Torslanda (SE); Lasse Olsson, Träslövsläge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,732

(22) Filed: Jun. 11, 2021

(65) Prior Publication Data

US 2021/0306841 A1 Sep. 30, 2021

Related U.S. Application Data

(63) Continuation of application No. 16/306,732, filed as application No. PCT/EP2017/063838 on Jun. 7, 2017, now Pat. No. 11,064,342.

(Continued)

(51) Int. Cl.
*H04W 8/12* (2009.01)
*H04W 60/00* (2009.01)
(Continued)

(52) U.S. Cl.
CPC .............. *H04W 8/12* (2013.01); *H04W 4/029* (2018.02); *H04W 24/08* (2013.01); *H04W 60/00* (2013.01); *H04W 60/06* (2013.01)

(58) Field of Classification Search
CPC ....... H04W 8/12; H04W 4/029; H04W 24/08; H04W 60/00; H04W 60/06; H04W 4/021
See application file for complete search history.

(56) References Cited

U.S. PATENT DOCUMENTS 7,069,000 B1 6/2006 Corson et al.
8,571,583 B2 10/2013 Tontinuttananon et al.
(Continued)

FOREIGN PATENT DOCUMENTS

CN 1972514 A 5/2007
CN 101047972 A 10/2007
(Continued)

OTHER PUBLICATIONS

Author Unknown, "Technical Specification Group Services and System Aspects; Study on Architecture for Next Generation System (Release 14)," Technical Report 23.799, Version 0.4.0, 3GPP Organizational Partners, Apr. 2016, 96 pages.

(Continued)

*Primary Examiner* — Justin T Van Roie
(74) *Attorney, Agent, or Firm* — Withrow & Terranova, PLLC

(57) ABSTRACT

Disclosed herein is a method of operation of a network node and a network node for executing the method to enable definition of an allowed area in which data services are provided to a wireless device, the allowed area having a size defined by one or more criteria comprising a predefined maximum number of tracking areas within the allowed area, the method comprises: upon attachment of the wireless device, accepting registrations of new tracking areas for the allowed area of the wireless device as long as the one or more criteria that define the size of the allowed area are satisfied.

19 Claims, 18 Drawing Sheets

UPON ATTACHMENT, ACCEPTING REGISTRATIONS OF NEW TRACKING AREAS FOR THE ALLOWED AREA AS LONG AS ONE OR MORE CRITERIA DEFINING THE SIZE OF THE ALLOWED AREA (E.G., MAXIMUM NUMBER OF TRACKING AREAS FOR THE ALLOWED AREA) ARE SATISFIED

- ACCEPTING A REGISTRATION OF A NEW TRACKING AREA IF THE NUMBER OF TRACKING AREAS ALREADY ACCEPTED FOR THE ALLOWED AREA IS LESS THAN THE PREDEFINED MAXIMUM NUMBER OF TRACKING AREAS WITHIN THE ALLOWED AREA; AND/OR
- REJECTING REGISTRATION OF A NEW TRACKING AREA IF THE NUMBER OF TRACKING AREAS ALREADY ACCEPTED FOR THE ALLOWED AREA IS GREATER THAN OR EQUAL TO THE PREDEFINED MAXIMUM NUMBER OF TRACKING AREAS WITHIN THE ALLOWED AREA

Related U.S. Application Data

(60) Provisional application No. 62/352,271, filed on Jun. 20, 2016.

(51) Int. Cl.
    *H04W 4/029*      (2018.01)
    *H04W 24/08*      (2009.01)
    *H04W 60/06*      (2009.01)

(56) References Cited

U.S. PATENT DOCUMENTS

| | | | |
|---|---|---|---|
| 10,193,672 | B2 | 1/2019 | Maeda et al. |
| 11,064,342 | B2 * | 7/2021 | Ramle .................... H04W 8/12 |
| 2013/0003656 | A1 | 1/2013 | Cho et al. |
| 2019/0075511 | A1 | 3/2019 | Ryu et al. |

FOREIGN PATENT DOCUMENTS

| | | |
|---|---|---|
| WO | 2012050491 A1 | 4/2012 |
| WO | 2014012568 A1 | 1/2014 |
| WO | 2017194755 A1 | 11/2017 |

OTHER PUBLICATIONS

Author Unknown, "Technical Specification Group Services and System Aspects; Study on Architecture for Next Generation System (Release 14)," Technical Report 23.799, Version 0.5.0, 3GPP Organizational Partners, May 2016, 178 pages.

Author Unknown, "Technical Specification Group Services and System Aspects; Study on Architecture for Next Generation System (Release 14)," Technical Report 23.799, Version 1.2.1, 3GPP Organizational Partners, Nov. 2016, 526 pages.

Ericsson, "S2-162502: Core Network Architecture & Functional Allocation," Third Generation Partnership Project (3GPP), SA WG2 Meeting #115, May 23-27, 2016, 8 pages, Nanjing, P.R. China.

Ericsson, "S2-163164: Solution on Mobility on Demand," Third Generation Partnership Project (3GPP), SA WG2 Meeting #115, May 23-27, 2016, 6 pages, Nanjing, P.R. China.

Ericsson, "S2-163273: Update of solution on 'Mobility levels using Mobility and Session classes,'" Third Generation Partnership Project (3GPP), SA WG2 Meeting #116, Jul. 11-15, 2016, 5 pages, Vienna, Austria.

Nokia, "R3-061524: Tracking Area Principles in LTE," Third Generation Partnership Project (3GPP), TSG RAN WG3 meeting #53bis, Oct. 10-13, 2006, 3 pages, Seoul, Republic of Korea.

Nokia et al., "S2-162146: Architecture Requirements, Principles and Assumption: Reference architecture model based on assumptions," Third Generation Partnership Project (3GPP), SA WG2 Meeting #S2-114, Apr. 11-15, 2016, 5 pages, Sophia Antipolis, FR.

Office Action for Chinese Patent Application No. 201780037964.5, dated Jan. 6, 2021, 8 pages.

Extended European Search Report for European Patent Application No. 19173266.8, dated Jul. 31, 2019, 8 pages.

Examination Report for European Patent Application No. 19173266.8, dated Aug. 6, 2020, 6 pages.

Intention to Grant for European Patent Application No. 19173266.8, dated Mar. 30, 2021, 5 pages.

Search Report for Japanese Patent Application No. 2018-566342, dated Nov. 22, 2019, 27 pages.

Notice of Reasons for Rejection for Japanese Patent Application No. 2018-566342, dated Dec. 3, 2019, 6 pages.

Decision to Grant a Patent for Russian Patent Application No. 2018142545/07, dated May 17, 2019, 21 pages.

International Search Report and Written Opinion for International Patent Application No. PCT/EP2017/063838, dated Sep. 1, 2017, 12 pages.

International Preliminary Report on Patentability for International Patent Application No. PCT/EP2017/063838, dated May 18, 2018, 17 pages.

Non-Final Office Action for U.S. Appl. No. 16/306,732, dated Jun. 24, 2020, 9 pages.

Notice of Allowance for U.S. Appl. No. 16/306,732, dated Mar. 11, 2021, 8 pages.

Notice of Reasons for Rejection for Japanese Patent Application No. 2020-184893, dated Sep. 6, 2022, 8 pages.

\* cited by examiner

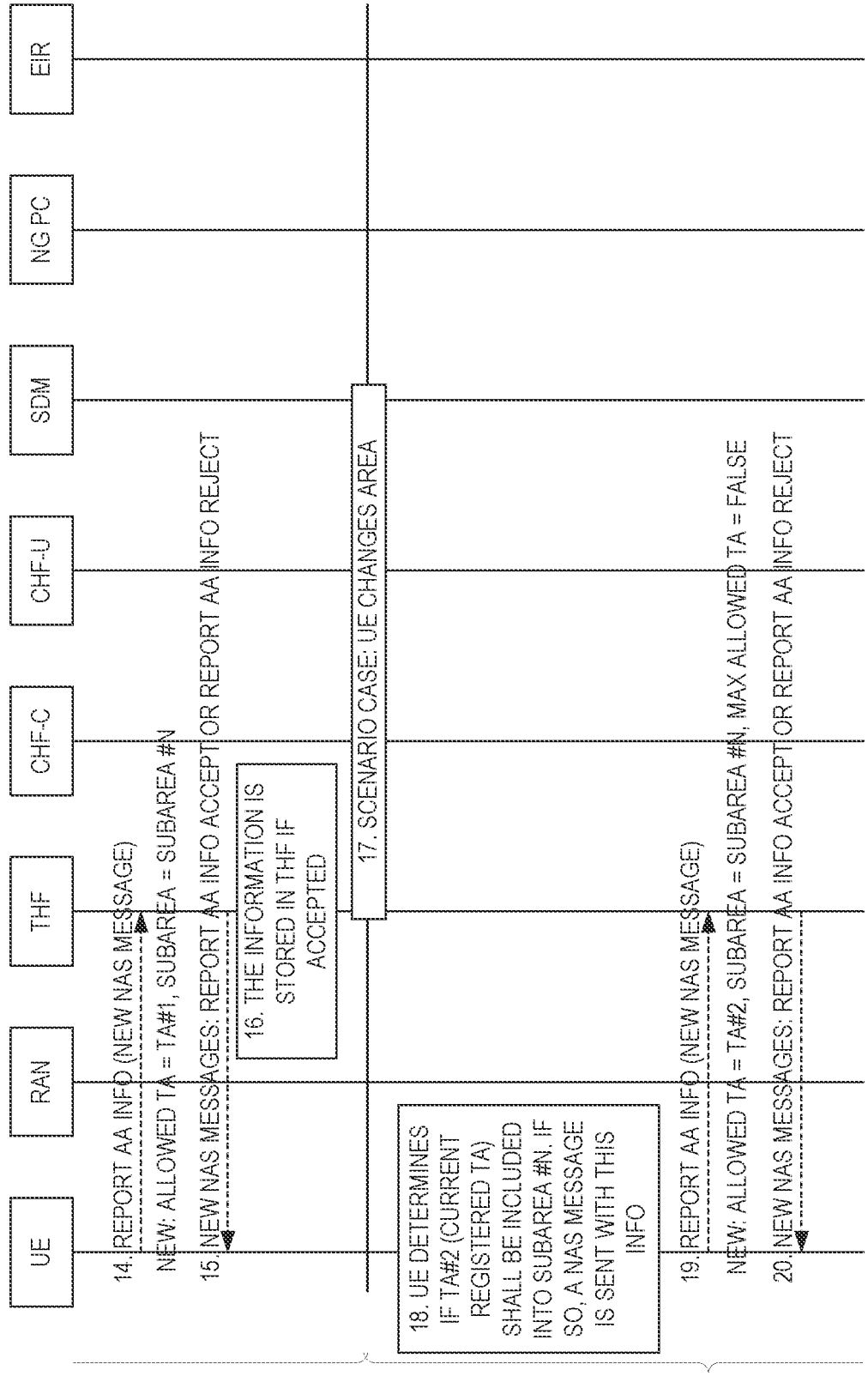

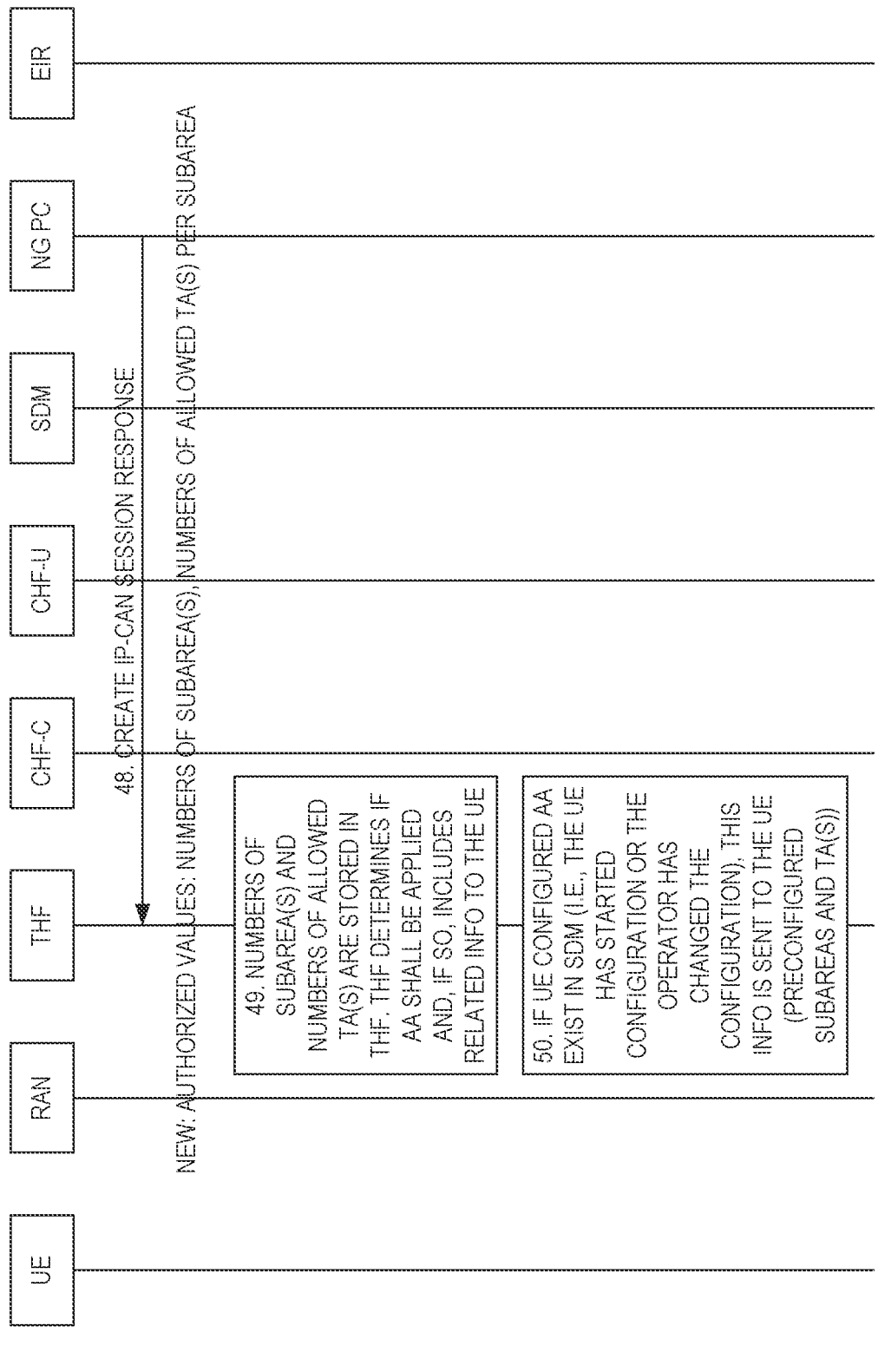

ALLOCATION OF ALLOWED REGISTERED AREA

This application is a continuation of U.S. patent application Ser. No. 16/306,732, filed Dec. 3, 2018, now U.S. Pat. No. 11,064,342, which is a 35 U.S.C. § 371 national phase filing of International Application No. PCT/EP2017/063838, filed Jun. 7, 2017, which claims the benefit of U.S. Provisional Application No. 62/352,271, filed Jun. 20, 2016, the disclosures of which are incorporated herein by reference in their entireties.

TECHNICAL FIELD

The present disclosure relates to allocating, or defining, an allowed area for a User Equipment device (UE) in a cellular communications network.

BACKGROUND

In Third Generation Partnership Project (3GPP) SA2 there is a Work Item (WI) study, FS_NextGen, which studies the Fifth Generation (5G) mobile network. The 3GPP progress so far is very premature. The architecture is still to be defined.

In 3GPP Technical Report (TR) 23.799 v0.4.0 (2016-4) clause 4.1 "High level Architecture Requirements" it is stated:

"The architecture of the "Next Gen" network shall
  1 Support the new RAT(s), the evolved LTE, and non-3GPP access types. GERAN and UTRAN is not supported.
    a) As part of non 3GPP access types, WLAN access and Fixed access shall be supported. Support for satellite access is FFS."

Today there exists an "Initial high level view" of the architecture (Nokia et al., "S2-162146: Architecture Requirements, Principles and Assumption: Reference architecture model based on assumptions," SA WG2 Meeting #S2-114, Apr. 11-15, 2016) approved at SA2 #114 (April 2016), which is illustrated in FIG. 1.

Ericsson had a Reference architecture contribution to SA2 #115 meeting (Ericsson, "S2-162502: Core Network Architecture & Functional Allocation," SA WG2 Meeting #115, May 23-27, 2016), which was not handled in the meeting. FIGS. 2 through 5 are from this contribution.

Next Generation (NG) Subscriber Data Management (NG SDM or SDM) is the subscription information storage including all information for the subscribers of the operator. When a subscriber connects to the network, subscription information is retrieved from the SDM. In a roaming scenario, the serving operator retrieves subscription information located in the home operator's network. The SDM can be seen as similar to the Home Subscriber Server (HSS) or Home Location Register (HLR), the first used for Long Term Evolution (LTE)/Evolved Packet System (EPS) and the second used for Global System for Mobile Communications (GSM)/Enhanced Data Rates for GSM Evolution (EDGE) Radio Access Network (GERAN) and Universal Terrestrial Radio Access Network (UTRAN).

NG Policy Control (NG PC) is a similar function as Policy Charging Rules Function (PCRF) used for GERAN, UTRAN, and Evolved UTRAN (E-UTRAN).

NG Core Control (NG CC) represents the control plane of the Core Network (CN) and has the similar functionality as the Mobility Management Entity (MME), and also the control plane of the Serving Gateway (S-GW) and the Packet Data Network (PDN) Gateway (P-GW) in E-UTRAN.

Traffic Handling Function (THF) represents a part of the control plane of the CN and has the similar functionality as the mobility part of MME in E-UTRAN.

Connection Handling Function (CHF) represents the other part of the control plane of the CN but also the user plane of the CN and has the similar functionality as the session part of MME in E-UTRAN and control plane part of the S-GW and the P-GW in E-UTRAN.

The THF and the CHF have the same functionality as the NG CC.

Note that GERAN and UTRAN are not supported in 5G nor included in this application.

The concept of "Mobility on Demand" is included in 3GPP TR 23.799 (V0.4.0) for key issue #3 "Mobility framework":

"How to support mobility on demand for different levels of mobility. Possible examples for different levels of mobility support are:
  Supported over a given area within a single RAN node (such as a cell of an eNodeB).
  Supported within a single RAN node (such as an eNodeB).
  Supported in a UE registration area (such as a TA in EPC).
  Supported in the service area of a control plane or user plane CN entity (such as an MME pool area or a Serving GW service area in EPC).
  Supported within a given RAT or combination of RATs integrated on the RAN level (such as LTE and 5G RAT).
  Supported between two access technologies.
  NOTE: Study on mobility limitations in RAN will be performed together with RAN working groups.
How to determine the level of UE mobility support, e.g. by what characteristics/method, which criteria; and
How to obtain the information (e.g. application's needs, device UE capabilities, used services) in order to determine the appropriate level of mobility of the UE."

For key issue #6 "Support for session and service continuity":

"In order to address the specific needs of different applications and services, the next generation system architecture for mobile networks should support different levels of data session continuity or service continuity based on the Mobility on demand concept of the Mobility framework defined in Key Issue 3."

The approved SA2 #115 contribution S2-163164 (Ericsson, "S2-163164: Solution on Mobility on Demand," SA WG2 Meeting #115, May 23-27, 2016) introduces Mobility class into a solution in 3GPP TR 23.799:

"6.3x2.1 Mobility Classes: By dividing the size of the allowed geographical area for the subscriber into a few sub-ranges it is possible to e.g. form the following Mobility classes:
  A. Unlimited (or high) mobility
    No (or minor) restrictions upon the allowed geographical area e.g. used by MBB users.
  B. Low mobility
    The allowed geographical area is limited e.g. used for stationary subscribers. The size could e.g. be limited to 5 TAs.
  C. No mobility
    The allowed geographical area is limited e.g. used for users accessing the network only via a fixed point (having their own access network with possible mobility). The size could e.g. be limited to 1 TA."

SUMMARY

As the Mobility class is only defining the size of the Allowed Area (AA), it doesn't say anything about where the UE could get service. Without any such restrictions (i.e. without defining the allowed Tracking Areas (TAs)), the assigned Mobility class will not put any limitations on the mobility of the UE as the UE doesn't occupy more than one TA at the time anyway. Therefore, there is a need to also define the actual AA and not only the size of the area.

It shall also be noted that the AA for a UE does not necessarily have to be a continuous area, e.g. for a Digital Subscriber Line (DSL) replacement with one area for a residence place and one area for a summer house, the AA is split into two subparts.

Due to the large amount of UEs and their individual AAs it must be fairly easy to define the AAs regardless of if they are statically defined by an operator or dynamically defined by aid from the UE's registration attempts.

Three different solutions are described. It shall however be noted that for some scenarios solution 1 is seen as an optional complement to solution 3.

Solution 1 is based on a pre-configuration per subscriber of the AA in the subscription database. The AA is optionally adjusted by the NG PC.

Solution 2 is based on a pre-configuration per subscriber of the number of subparts and their respective size. By aid from the end user the actual areas are configured in the UE, provided to the CN, and stored in the subscription database.

Solution 3 is based on a dynamic and temporary definition performed by the UE. The AA definition that is used by the UE and provided to the CN is only valid as long as the UE is attached. At detach any previous AA definition will be erased and at attach new TAs will automatically be added to the new AA definition until the maximum allowed number of TAs is reached. The solution is also based on a pre-configuration per subscriber of the number of AA. The operator may, as in solution 1, optionally configure in the subscription database the whole or parts of the AA for a subscriber. This pre-configured AA is provided to the UE at Attach accept and forms the base for the AA used by the UE. The NG PC may optionally add TAs to the pre-configured AA in case only parts of the AA are configured in the subscription database.

The benefit of this solution is that the solution is very easy from an Operations and Management (O&M) perspective. It gives the operator the possibility to use pre-configured AAs when that is feasible and if not the procedure automatically takes care of the AA definition for a UE. The drawback is that without a pre-configured AA a user may get service anywhere as long as detach and re-attach is performed but this is at the same time a benefit as it gives a solution for UEs needing more than one area of operation, e.g. for nomadic DSL replacement with one area for the residence place and another area for the summer house.

The solutions enable some frameworks for assignment of allowed area for a UE. Both methods for static and dynamic allocation of TAs to the allowed area are described as well as combinations thereof.

Some embodiments of the present solution are directed to a method of operation of a network node to enable definition of an allowed area in which data services are provided to a wireless device, the allowed area having a size defined by one or more criteria comprising a predefined maximum number of tracking areas within the allowed area. The method comprises: upon attachment of the wireless device, accepting registrations of new tracking areas for the allowed area of the wireless device as long as the one or more criteria that define the size of the allowed area are satisfied.

Some other embodiments of the present solution are directed to a network node that enables definition of an allowed area in which data services are provided to a wireless device, the allowed area having a size defined by one or more criteria comprising a predefined maximum number of tracking areas within the allowed area. The network node adapted to operatively: upon attachment of the wireless device, accept registrations of new tracking areas for the allowed area of the wireless device as long as the one or more criteria defining the size of the allowed criteria are satisfied Some other embodiments of the present solution is directed to a network node that enables definition of an allowed area in which data services are provided to a wireless device, the allowed area having a size defined by one or more criteria comprising a predefined maximum number of tracking areas within the allowed area. The network node comprises: at least one processor; and memory storing instructions executable by the at least one processor whereby the network node is operable to, upon attachment of the wireless device, accept registrations of new tracking areas for the allowed area of the wireless device as long as the one or more criteria defining the size of the allowed criteria are satisfied.

Some other embodiments of the present solution is directed to a network node that enables definition of an allowed area in which data services are provided to a wireless device, the allowed area having a size defined by one or more criteria comprising a predefined maximum number of tracking areas within the allowed area. The network node comprises: a registration processing module operable to, upon attachment of the wireless device, accept registrations of new tracking areas for the allowed area of the wireless device as long as the one or more criteria defining the size of the allowed criteria are satisfied.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 6A through 6I illustrates various example scenarios according to some embodiments of the present disclosure;

DETAILED DESCRIPTION

Figure 1:
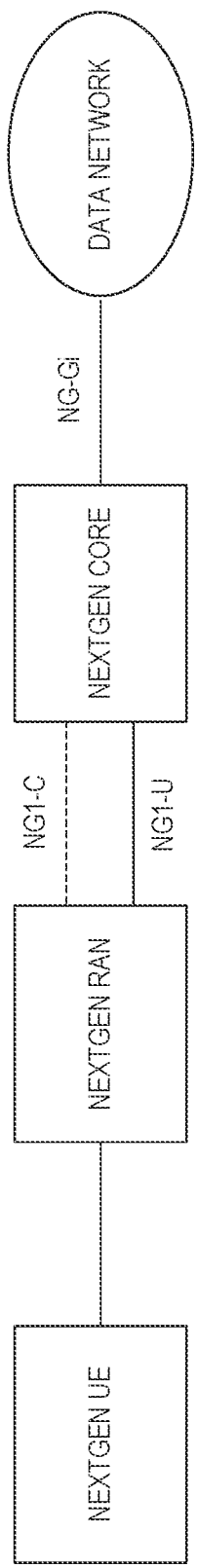
FIG. 1 illustrates a NG network architecture.
Figure 2:
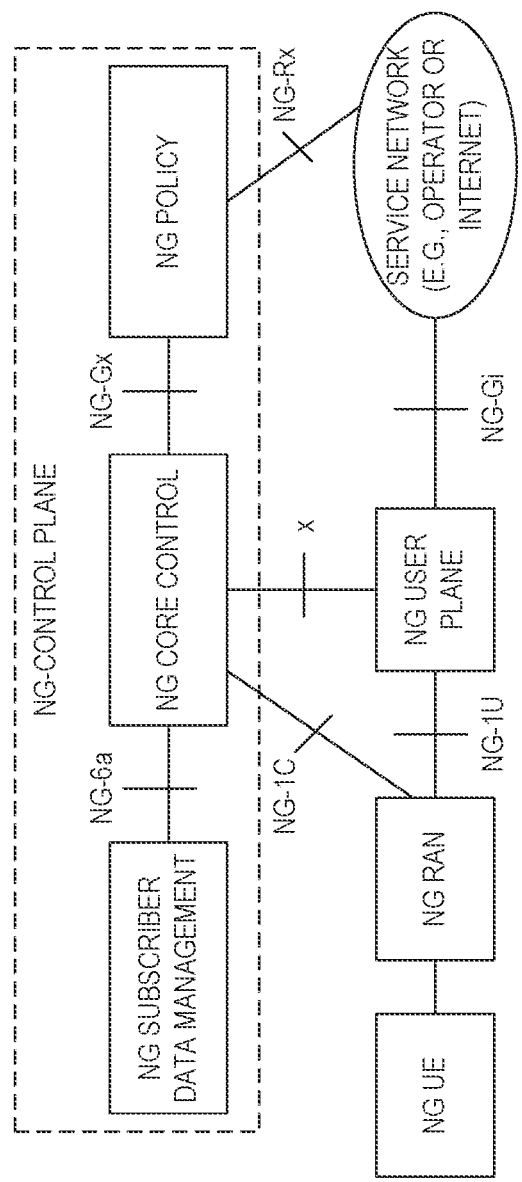
FIG. 2 illustrates a non-roaming functional reference architecture.
Figure 3:
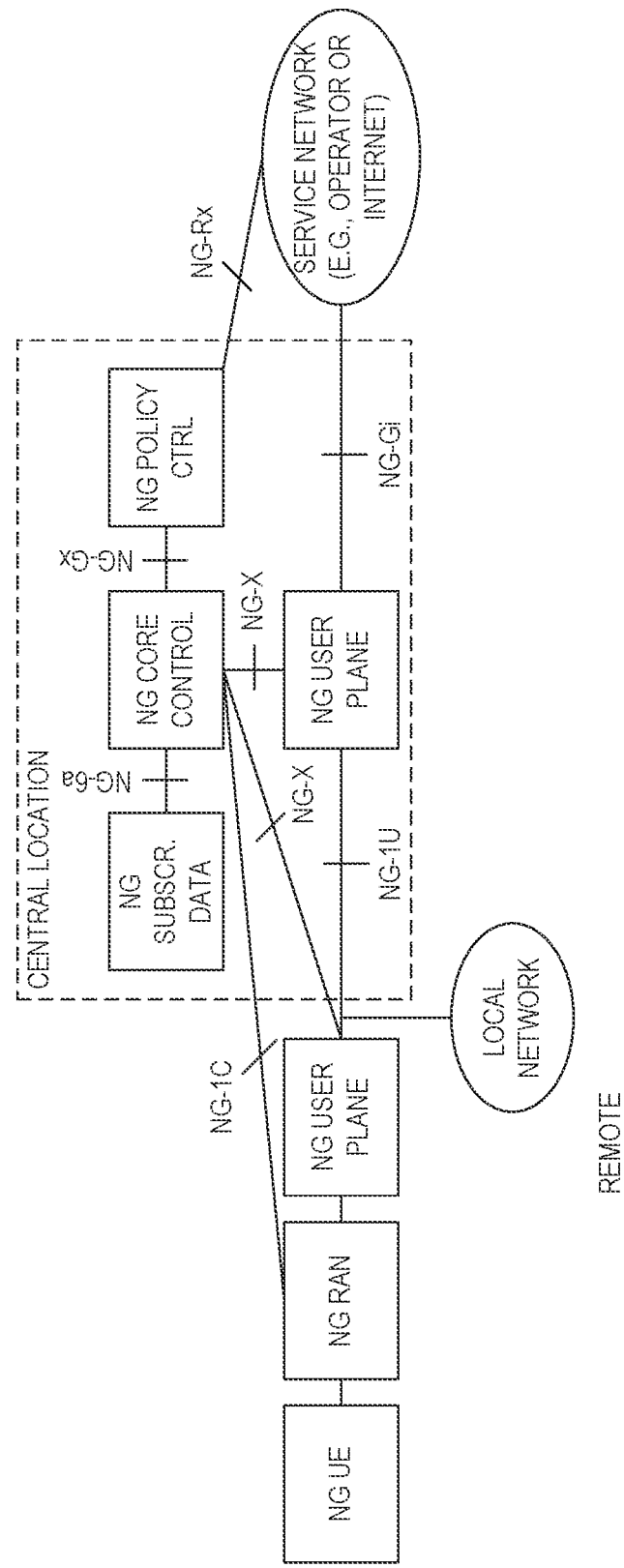
FIG. 3 illustrates a distributed user plane deployment, non-roaming.
Figure 4:
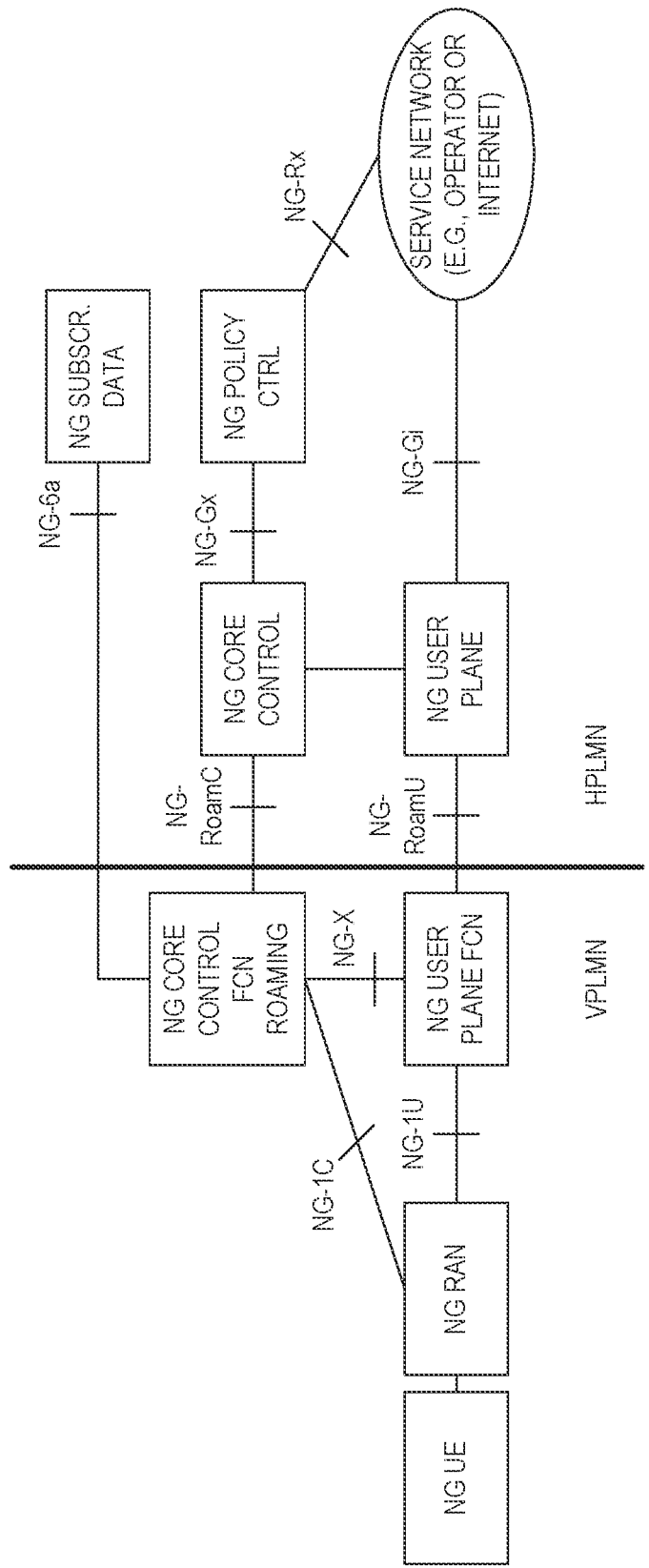
FIG. 4 illustrates roaming (Home-routed)
Figure 5:
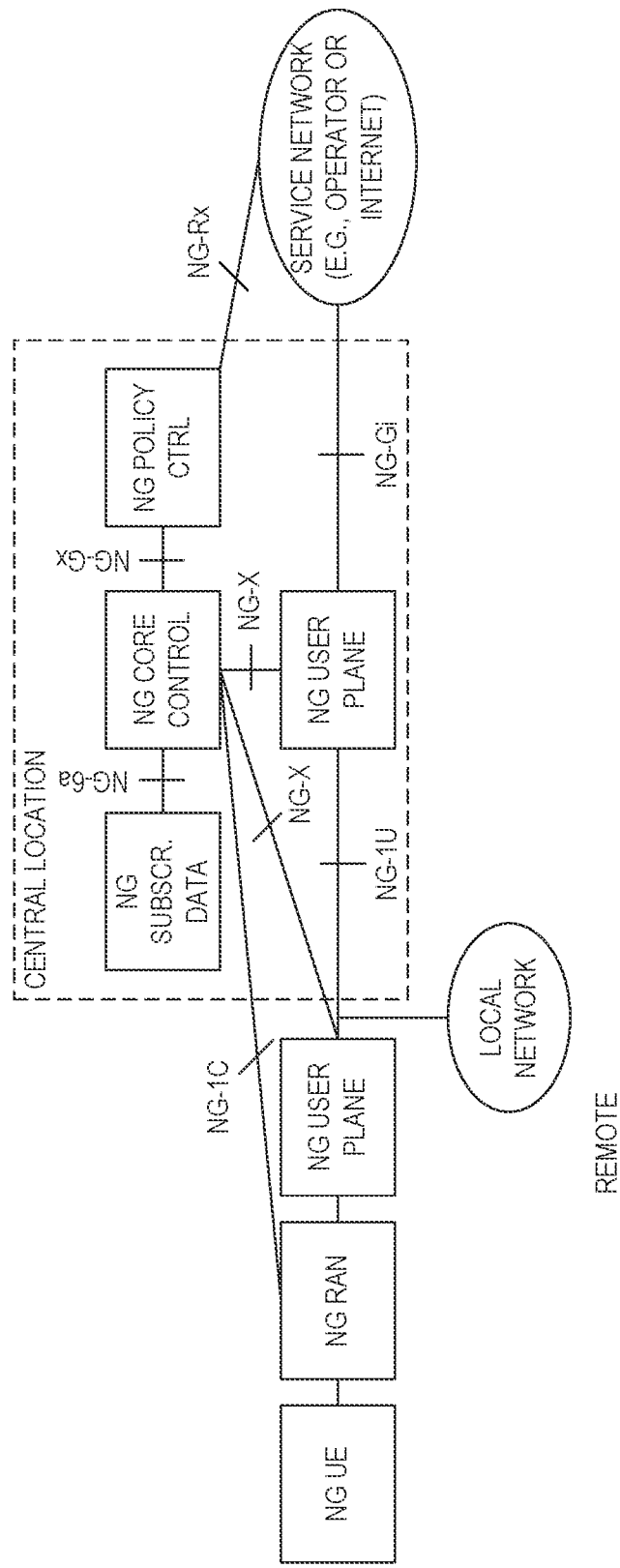
FIG. 5 illustrates roaming (Local Breakout in Visited Public Land Mobile Network (VPLMN))
Figure 6A:
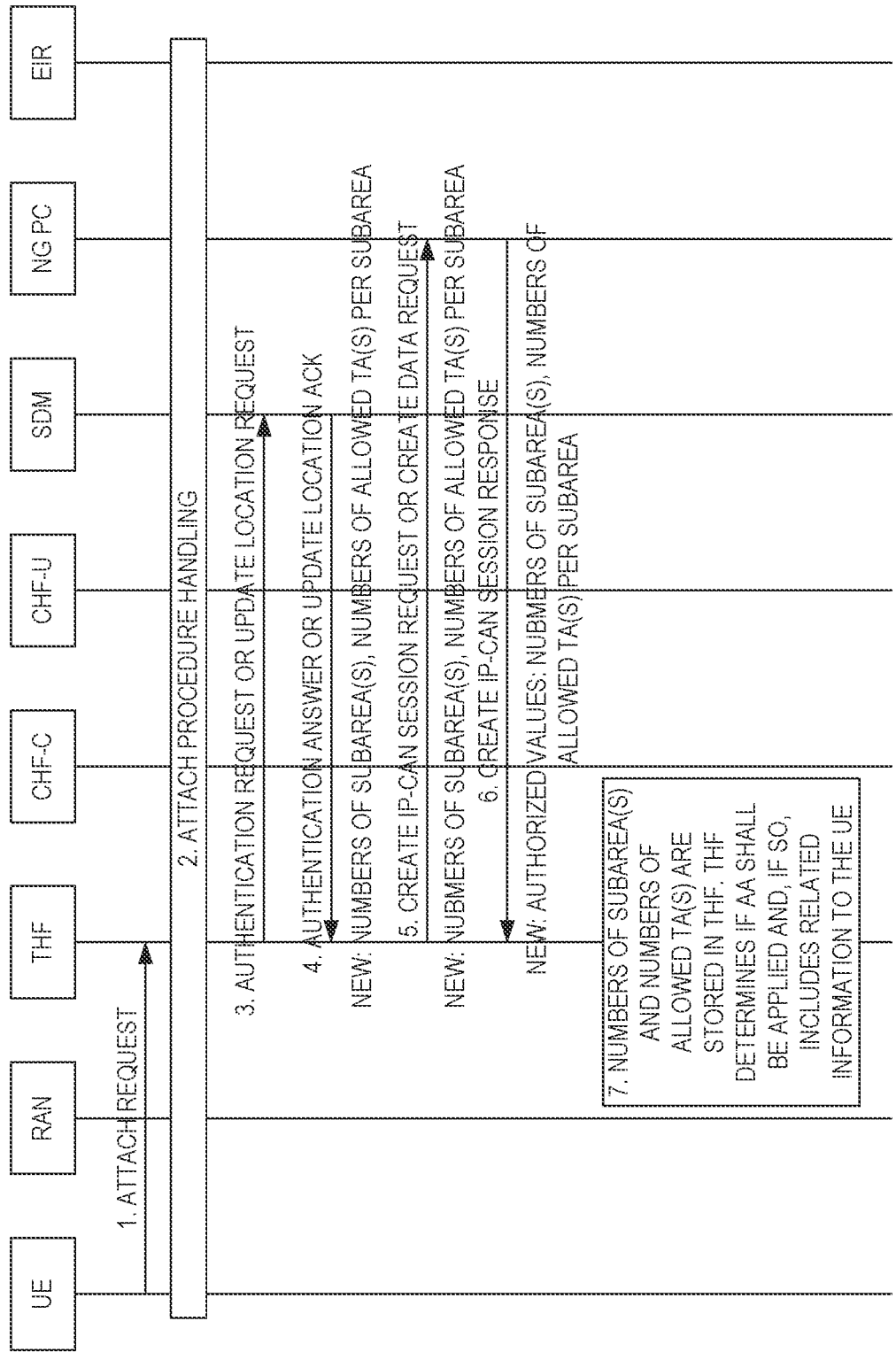
Figure 6B:
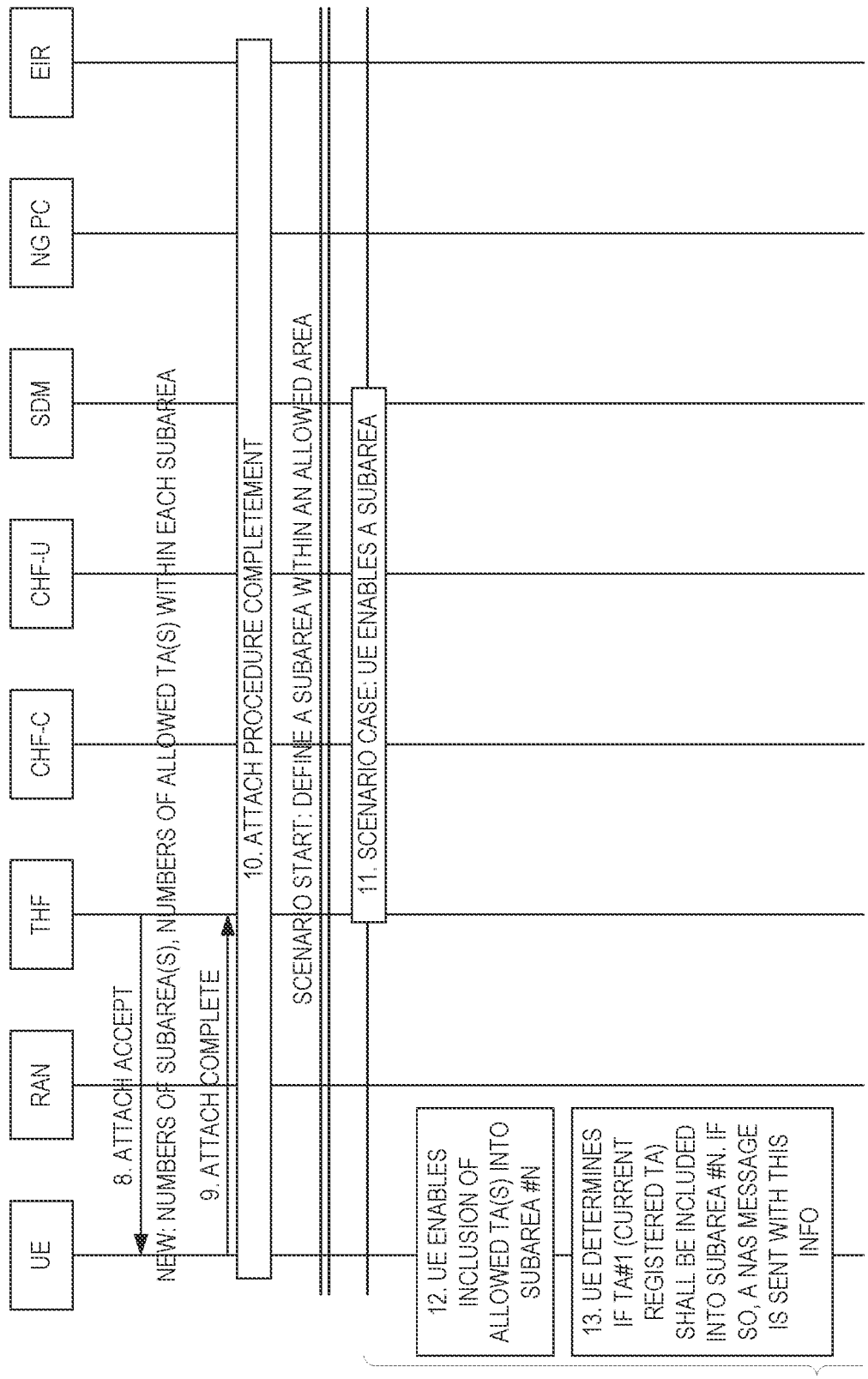
Figure 6D:
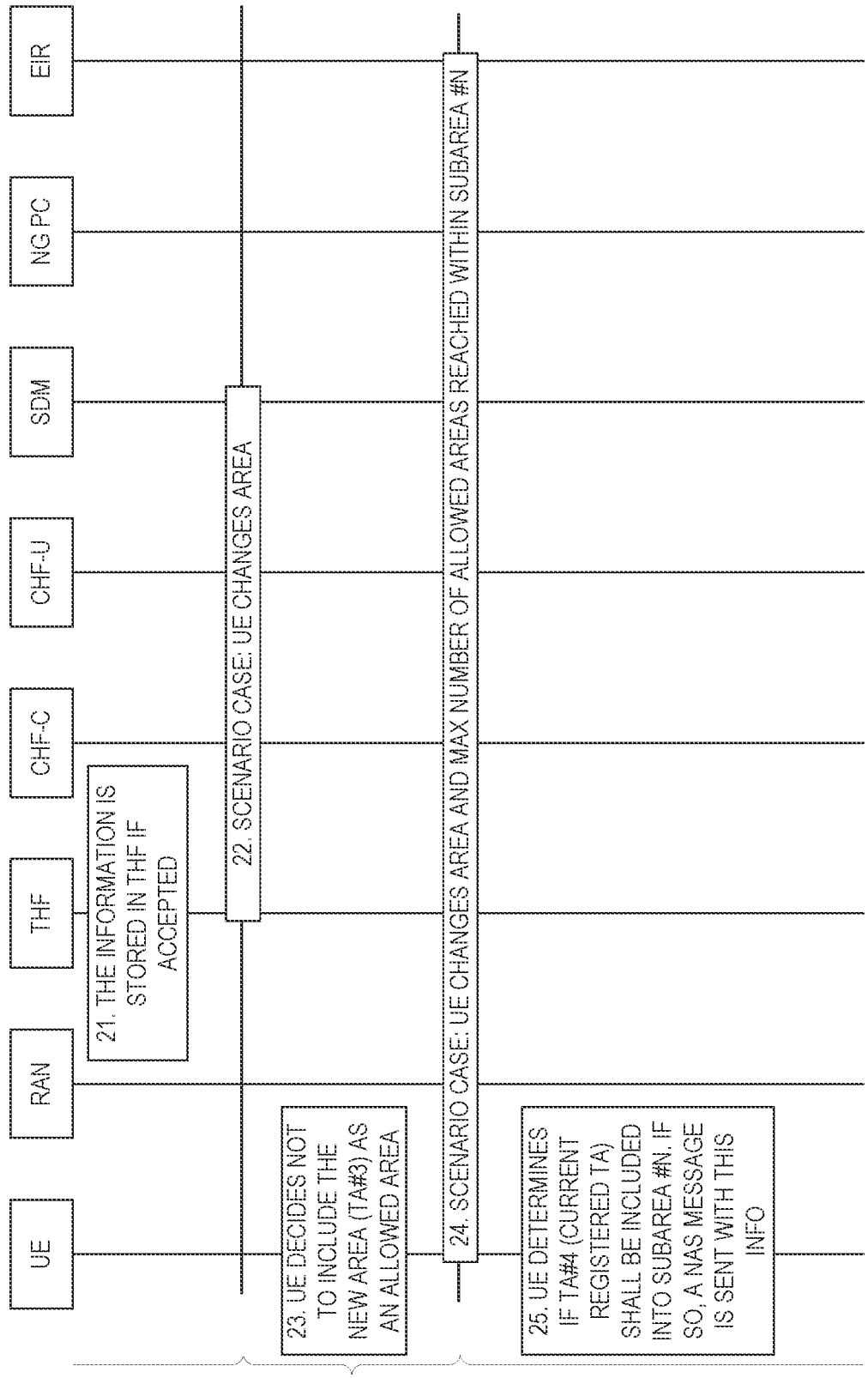
Figure 6E:
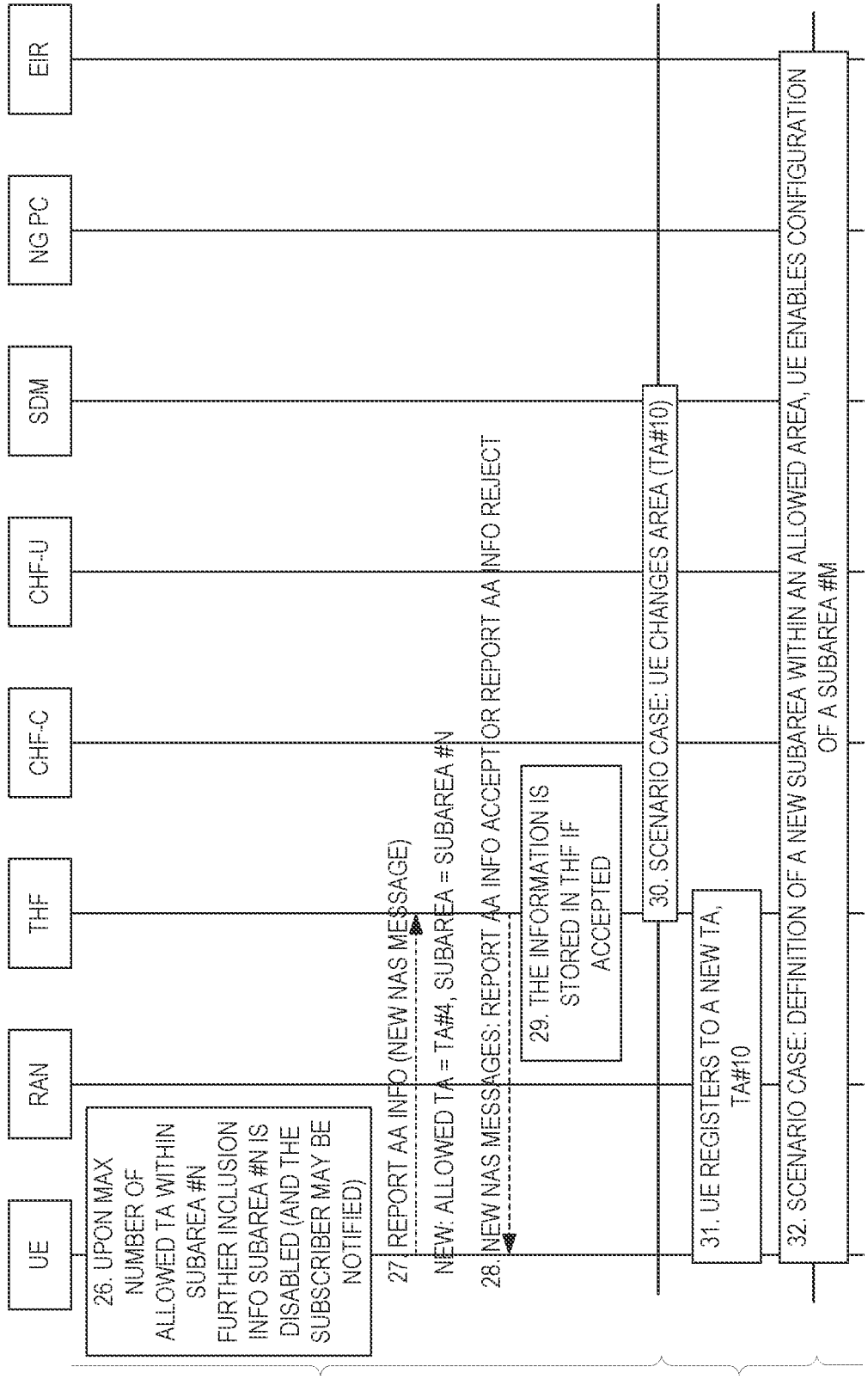
Figure 6F:
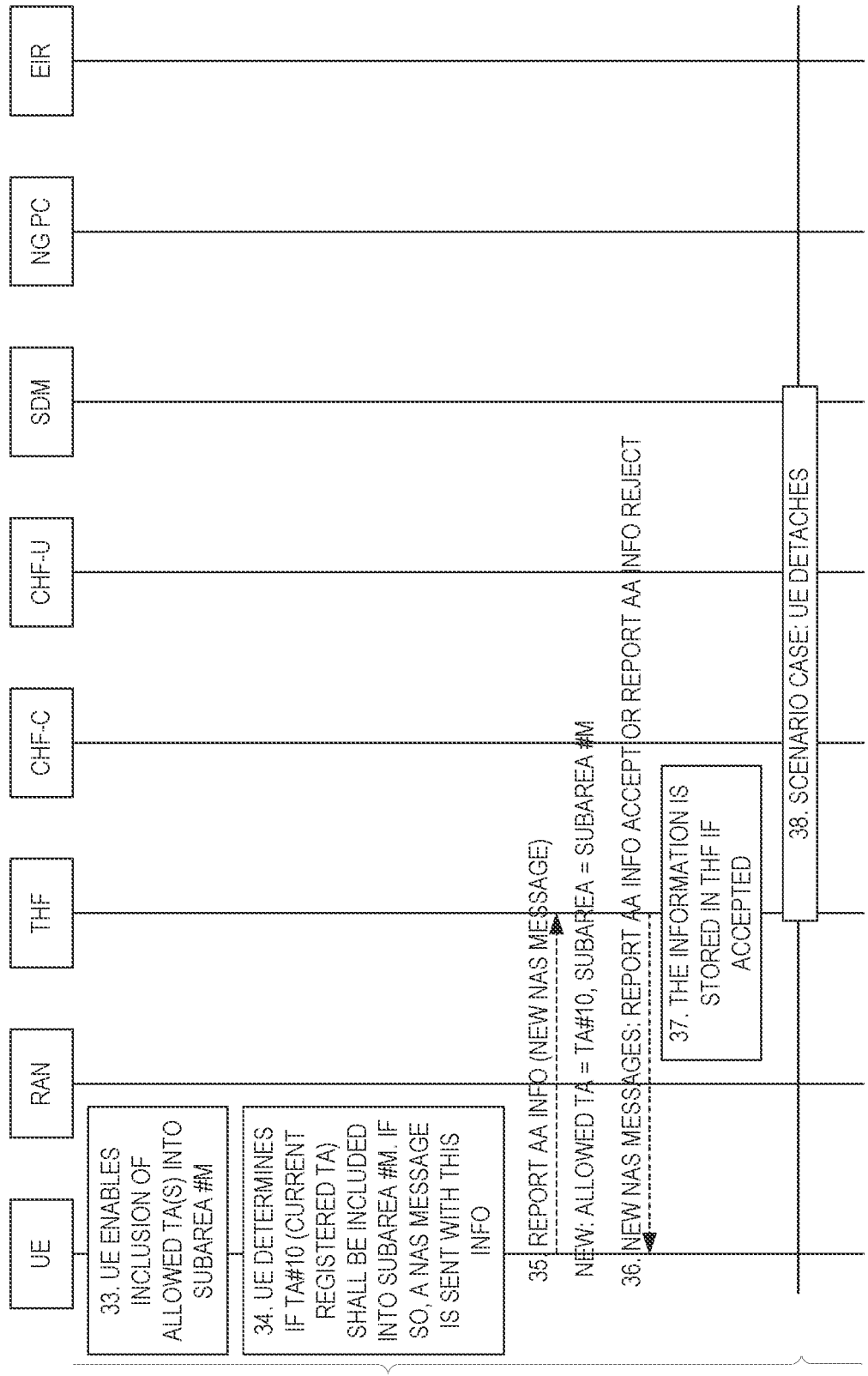
Figure 6G:
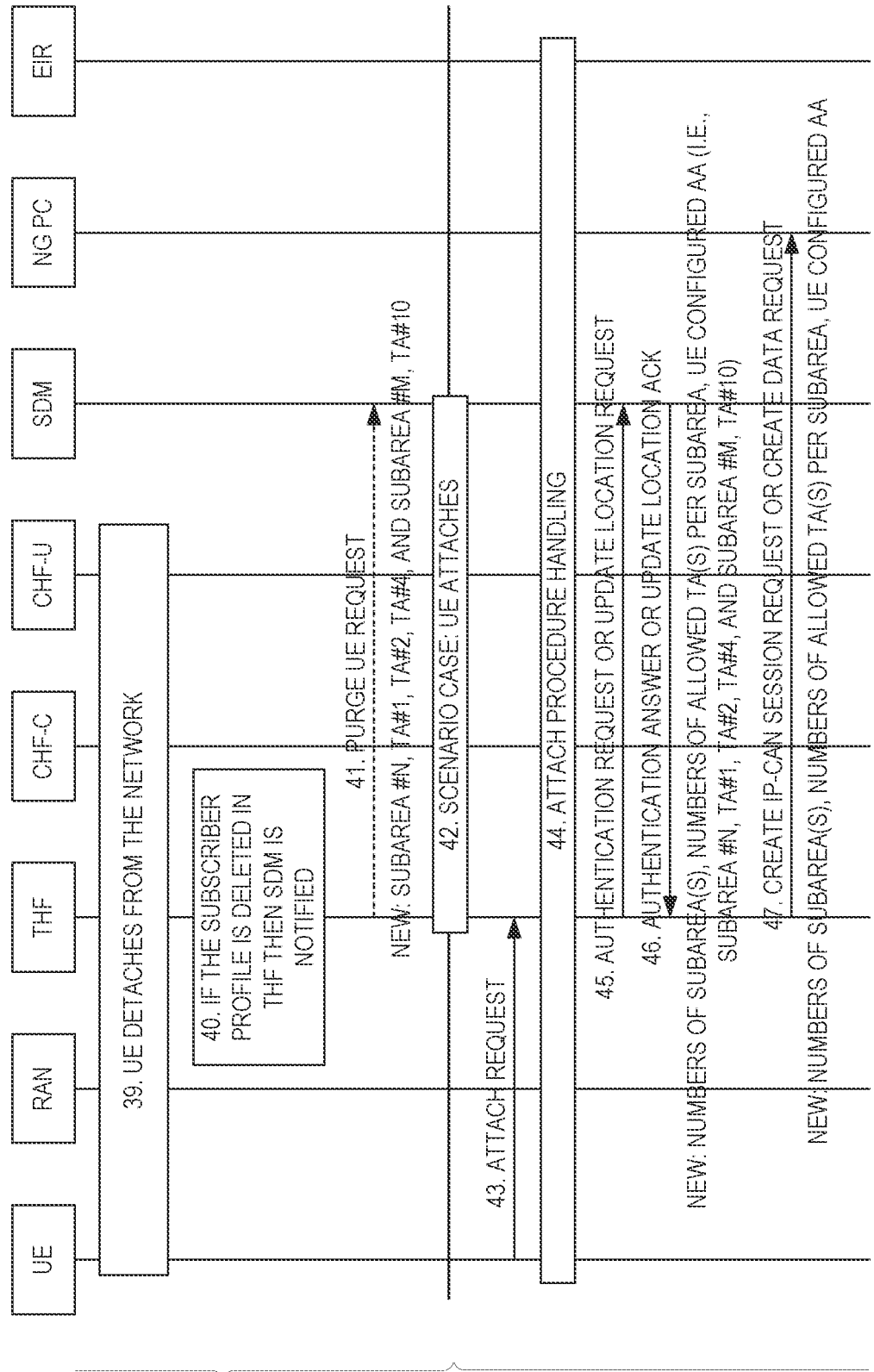
Figure 6I:
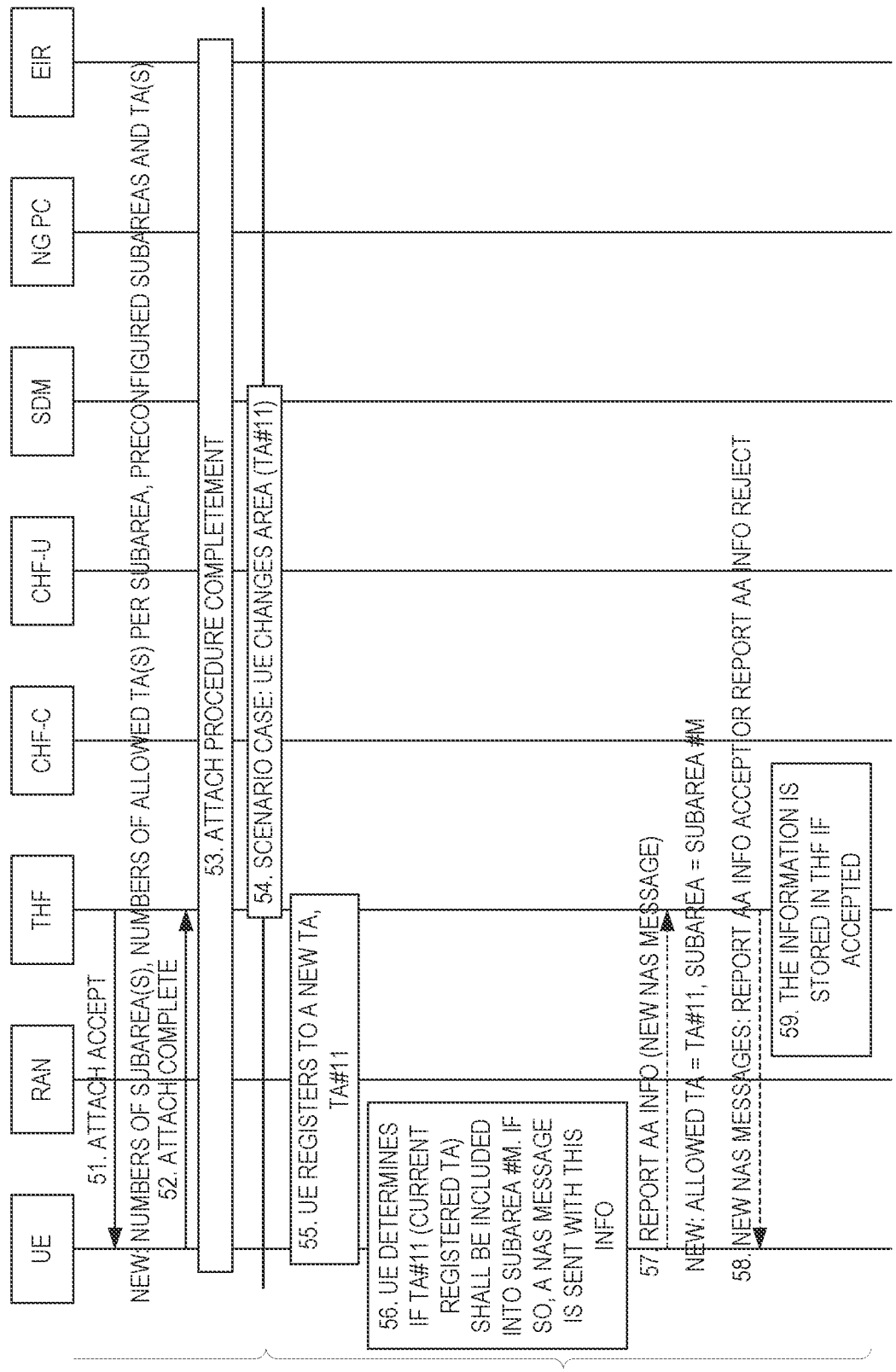

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a CN. Some examples of a core network node include, e.g., a MME, a P-GW, a Service Capability Exposure Function (SCEF), a THF, a CHF Control Plane (CHF-C), a CHF User Plane (CHF-U), a SDM, a NG PC, an Equipment Identity Register (EIR), or the like.

Wireless Device: As used herein, a "wireless device" is used interchangeably with "UE." The terms "wireless device" and "UE" are used herein to refer to any type of device that has access to (i.e., is served by) a cellular communications network by wirelessly transmitting and/or receiving signals to a radio access node(s). Some examples of a wireless device include, but are not limited to, a 3GPP LTE UE in a 3GPP network (or similar device in a NG network) and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP terminology or terminology similar to 3GPP terminology is oftentimes used. However, the concepts disclosed herein are not limited to 3GPP system.

Note that, in the description herein, reference may be made to the term "cell;" however, particularly with respect to 5G-concepts, beams may be used instead of cells and, as such, it is important to note that the concepts described herein are equally applicable to both cells and beams.

As the Mobility class is only defining the size of the AA it doesn't say anything about where the UE could get service. Without any such restrictions (i.e., without defining the allowed TAs or similar) the assigned Mobility class will not put any limitations on the mobility of the UE as the UE anyway doesn't occupy more than one TA at the time. Therefore, there is a need to also define the actual AA and not only the size of the area.

It shall also be noted that the AA for a UE does not necessarily have to be a continuous area, e.g. for a DSL replacement with one area for a residence place and one area for a summer house, the AA is split into two subparts.

Due to the large amount of UEs and their individual AAs it must be fairly easy to define the AAs regardless of if they are statically defined by an operator or dynamically defined by aid from UE's registration attempts.

At definition of an AA there is a risk for mistakes resulting in a less than perfect AA and it is therefore necessary to use a mechanism that allows for corrections. At the same time misuse must be prevented. If the subscribers are to be allowed to correct their AAs, the correction mechanism must impose some degree of effort from the user or some service degradation during the change or else will the assigned Mobility class not introduce any perceived geographically based restrictions. Without such constraints a Low mobility class subscription may be purchased but the UE still being used everywhere with full service.

When defining the TAs of an AA, the mechanism must either to a good degree ensure that the adding of a TA is intentional or that it is easy to correct a mistake. There is a balance: the easier it is to make mistakes the easier it must be to correct them.

A number solutions are described below. Note that these solutions, while described separately, may be combined as needed or desired for any particular implementation.

Solution 1

One solution would be to let the operator configure in the subscription database the AA for each UE with a Low or No mobility class and then optionally let the NG PC or a similar policy control function adjust the AA.

A benefit would then be that the AA could be split in as many subparts as there are TAs and that misuse becomes almost impossible as every change has to go through the operator.

With many stationary Internet of Things (IoT) devices, this will however become a heavy O&M task for the operator and knowing the exact location of operation for each device already when selling the subscription is not always possible. For UEs allowed to roam it could also be difficult to know the TAs in an allowed area in a visited network.

This solution may, for example, be particularly useful for cases when the operator knows the exact location of operation of a UE.

Solution 2

Another solution would be to, at registration, assign the UE a number of allowed subparts in the AA and the number of allowed TAs or similar per subpart.

This information is provided by the SDM or a similar subscription data storage or subscription data base and optionally adjusted by the NG PC or a similar policy control function. The UE would be allowed to register anywhere but only be allowed to use data services in TAs or similar included in the AA. To add TAs or similar to the AA a user would, via configuration, first have to start the procedure, identify the subpart to use and then after each concluded Attach or TA Update (TAU) or similar accept or reject adding of the current TA or similar to the identified subpart of the AA. The TAs would then also need to be stored in the subscription database.

Adding of new TAs or similar will continue till either the maximum no of TAs or similar is added or until the user, via configuration, stop the procedure or start the definition procedure for another subpart of the AA.

In non-accepted TAs or similar, the UE will not be allowed to use data services, service request or similar will be rejected as well as Mobile Terminating (MT) data.

At registration, the UE will be provided with the stored definition of its AA. This is provided from the SDM or similar, e.g. via the THF, to the UE whenever subscription data is fetched from the subscription database. It will be possible to include TAs or similar from both the home network and from visiting networks in the definition of an AA. TAs or similar added by mistake will be possible for the home operator to correct by changing the stored AA.

The diagram of FIGS. 6A through 6I shows how the UE configures and selects different subareas for various embodiments of Solution 2. Note, however, that while many scenarios are illustrated, the present disclosure is not limited thereto. Further, in some embodiments, no all of the steps illustrated in FIGS. 6A through 6I may be performed. The diagram of FIGS. 6A through 6I shows some scenarios where the UE registers to different TAs and if the subscriber has enabled the inclusion to a specific subarea, TAs can be attached to the subarea as decided by the subscriber. It also shows how that the configured subarea or allowed area in the UE is sent to the network and is stored in the THF. Upon a change of THF, the stored information is sent both between Source and Target THF as well as from SDM to the Target THF.

The benefit with this solution is that the AA is defined by the end user and that adding of TAs must be acknowledged by the end user (i.e., intentionally). As in the previous solution, an AA could be split in as many subparts as there are TAs and misuse becomes almost impossible as every correction has to go through the operator.

Letting the end user start the procedure and then acknowledge every TA may be too cumbersome for some users. There is also a risk that TAs are incorrectly added due to the prospect of getting service in the current location while instead the scarce number of accepted TAs should have been saved for more precious locations.

In order to minimize the cost of deployment for simple IoT devices the manual intervention should be kept to a minimum. Defining their AAs need to be done automatically, e.g. starting the definition procedure for their only area at attach and then just accept any TAs until the maximum no of TAs are reached. If the IoT device should be moved to another location the AA needs to be reset which requires an operator intervention.

As seen from above there is a risk of a substantial number of incorrect AA definitions, calls to the helpdesk, and in the end operator intervention to correct them.

Solution 3

By starting the definition procedure each time a UE attaches, and then accepting every new TA or similar until the maximum number of TAs is reached, an automatic AA definition procedure is created. The maximum number of TAs is provided by the SDM and optionally adjusted by the NG PC. Once the AA is completely defined (i.e., max number of TAs is reached) the UE will be rejected when trying to register in a new TA. Having added a TA by mistake is easily taken care of by detach and then re-attach whereby the AA gets a fresh restart. At change of CN node, the AA definition is transferred from old to new node if an interface exists, otherwise the UE will (as in legacy) be forced to reattach. Allowed TAs may be served by different CN nodes.

As an option, it shall also be possible for the operator to configure and store the whole or parts of the AA for a UE. The pre-configured AA is transferred to the UE in the Attach accept messages. Optionally the NG PC in the serving network may add TAs in case only parts of the AA are defined in the subscription database. This option could also be used by the operator to limit the mobility of a UE that in some way has been misusing the feature (e.g., repetitively performing detach and attach). The operator could then configure a static AA for the UE.

Figure 7:
FIG. 7 illustrates the operation of a network node according to some embodiments of the present disclosure.

In this regard, FIG. 7 illustrates one example of Solution 3. In this example, a network node (e.g., the THF) operates to, upon attachment of a UE, accept registrations of new TAs or similar for the AA of the UE as long as one or more criteria defining a maximum size of the AA of the UE are satisfied. The one or more criteria defining the maximum size of the AA of the UE may include, as described above, a maximum number of TAs or similar within the AA. Once the UE is attached, in some embodiments, the UE includes TA(s) or similar into the AA. The network node (e.g., the THF) then performs the process of FIG. 7 to either accept or reject the registration based on the maximum number of TAs allowed for the AA (i.e., accept the registration if the number of TAs or similar already registered in that AA is less than the maximum and otherwise reject the registration). Further, upon acceptance of the registration, the network node (e.g., the THF) stores information regarding the registration of the TA or similar in the AA for the UE. In addition, in some embodiments, the network node may provide information regarding the AA of the UE (e.g., information regarding the TAs or similar registered in the AA of the UE) to one or more other network nodes.

Example Embodiments of a Network Node and a UE

Figure 8:
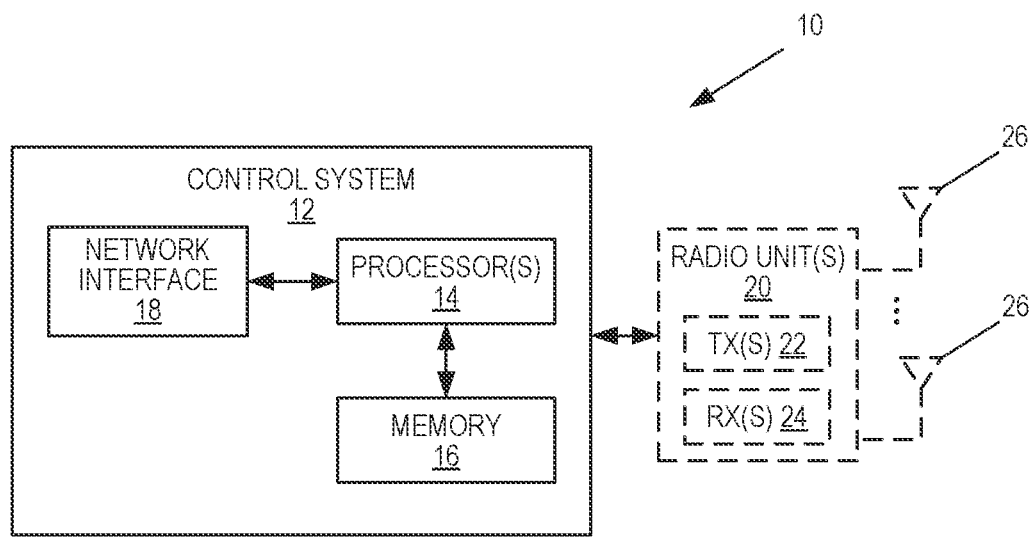
FIGS. 8 through 10 illustrates example embodiments of a network node.

FIG. 8 is a schematic block diagram of a network node 10 according to some embodiments of the present disclosure. The network node 10 may be any network node in the Radio Access Network (RAN) or CN. For example, the network node 10 may be a base station or other radio access node in the RAN or the THF, CHF-C, CHF-U, SDM, NG PC, or EIR or similar in the CN. As illustrated, the network node 10 includes a control system 12 that includes one or more processors 14 (e.g., Central Processing Units (CPUs), Application Specific Integrated Circuits (ASICs), Field Programmable Gate Arrays (FPGAs), and/or the like), memory 16, and a network interface 18. In addition, if the network node 10 is a radio access node, the network node 10 includes one or more radio units 20 that each includes one or more transmitters 22 and one or more receivers 24 coupled to one or more antennas 26. In some embodiments, the radio unit(s) 20 is external to the control system 12 and connected to the control system 12 via, e.g., a wired connection (e.g., an optical cable). However, in some other embodiments, the radio unit(s) 20 and potentially the antenna(s) 26 are integrated together with the control system 12. The one or more processors 14 operate to provide one or more functions of the network node 10 as described herein. In some embodiments, the function(s) are implemented in software that is stored, e.g., in the memory 16 and executed by the one or more processors 14.

Figure 9:
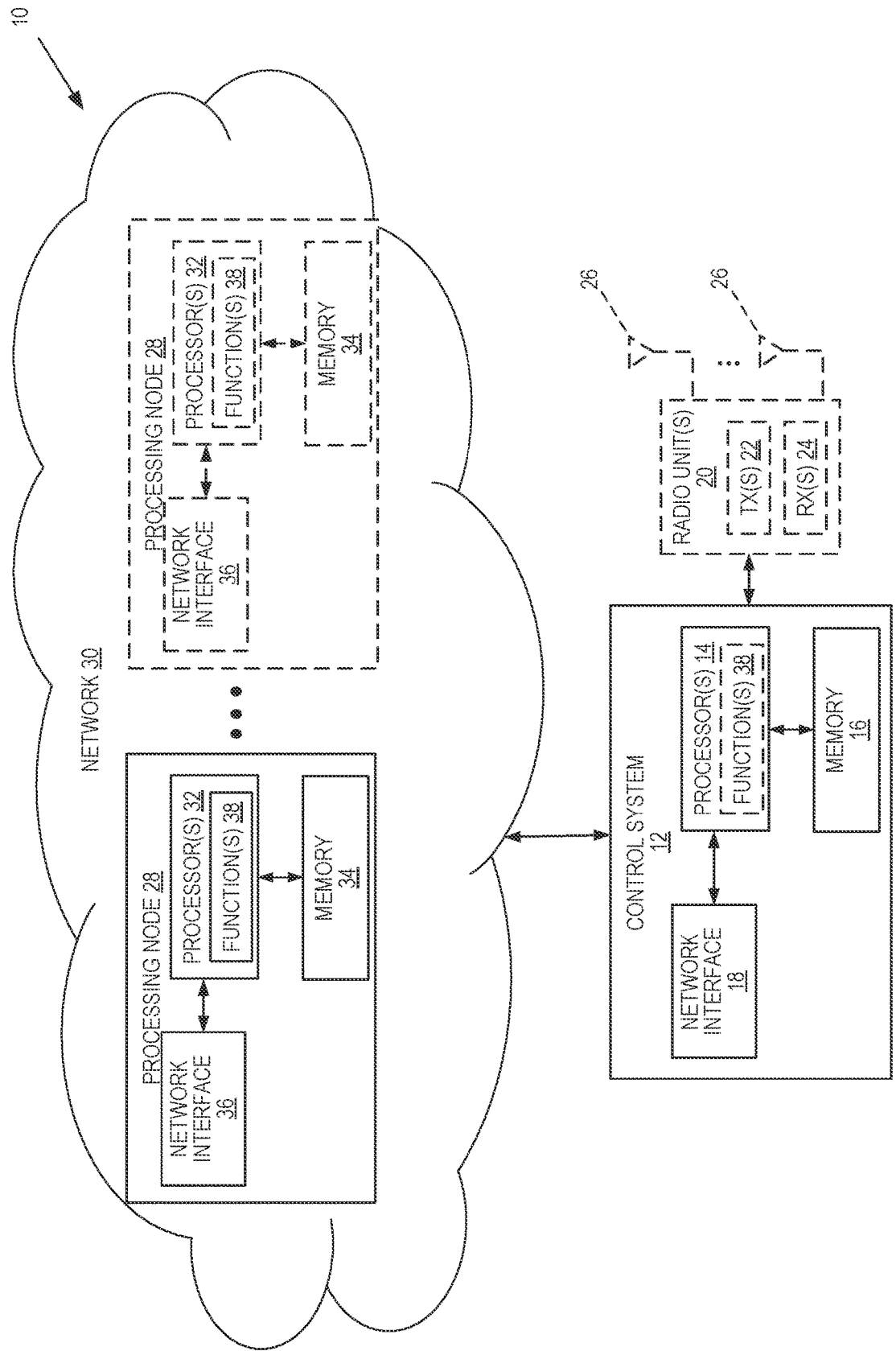

FIG. 9 is a schematic block diagram that illustrates a virtualized embodiment of the network node 10 according to some embodiments of the present disclosure. As used herein, a "virtualized" network node 10 is an implementation of the network node 10 in which at least a portion of the functionality of the network node 10 is implemented as a virtual component(s) (e.g., via a virtual machine(s) executing on a physical processing node(s) in a network(s)). As illustrated, in this example, the network node 10 includes the control system 12 that includes the one or more processors 14 (e.g., CPUs, ASICs, FPGAs, and/or the like), the memory 16, and the network interface 18 and, optionally, the one or more radio units 20 that each includes the one or more transmitters 22 and the one or more receivers 24 coupled to the one or more antennas 26, as described above. The control system 12 is connected to the radio unit(s) 20 via, for example, an optical cable or the like. The control system 12 is connected to one or more processing nodes 28 coupled to or included as part of a network(s) 30 via the network interface 18. Each processing node 28 includes one or more processors 32 (e.g., CPUs, ASICs, FPGAs, and/or the like), memory 34, and a network interface 36.

In this example, functions 38 of the network node 10 described herein are implemented at the one or more processing nodes 28 or distributed across the control system 12 and the one or more processing nodes 28 in any desired manner. In some particular embodiments, some or all of the functions 38 of the network node 10 described herein are implemented as virtual components executed by one or more virtual machines implemented in a virtual environment(s) hosted by the processing node(s) 28. As will be appreciated by one of ordinary skill in the art, additional signaling or communication between the processing node(s) 28 and the control system 12 is used in order to carry out at least some of the desired functions 38. Notably, in some embodiments, the control system 12 may not be included, in which case the radio unit(s) 20 (if included) communicate directly with the processing node(s) 28 via an appropriate network interface(s). In other embodiments, the network node 10 does not include either the control system 12 or the radio unit(s) 20 such that the network node 10 is entirely virtualized.

In some embodiments, a computer program including instructions which, when executed by at least one processor, causes the at least one processor to carry out the functionality of the network node 10 or a node (e.g., a processing node 28) implementing one or more of the functions 38 of the network node 10 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
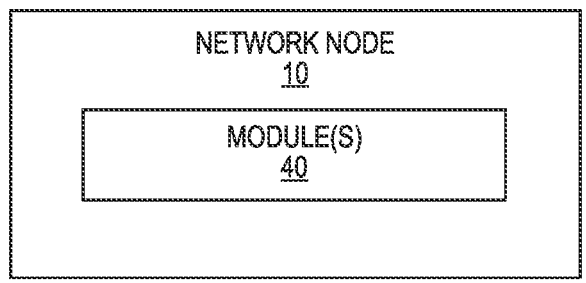

FIG. 10 is a schematic block diagram of the network node 10 according to some other embodiments of the present disclosure. The network node 10 includes one or more modules 40, each of which is implemented in software. The module(s) 40 provide the functionality of the network node 10 described herein. This discussion is equally applicable to the processing node 28 of FIG. 9 where the modules 40 may be implemented at one of the processing nodes 28 or distributed across multiple processing nodes 28 and/or distributed across the processing node(s) 28 and the control system 12. As an example, the module(s) 40 may include one or more modules operable to perform the process of FIG. 7.

Figure 11:
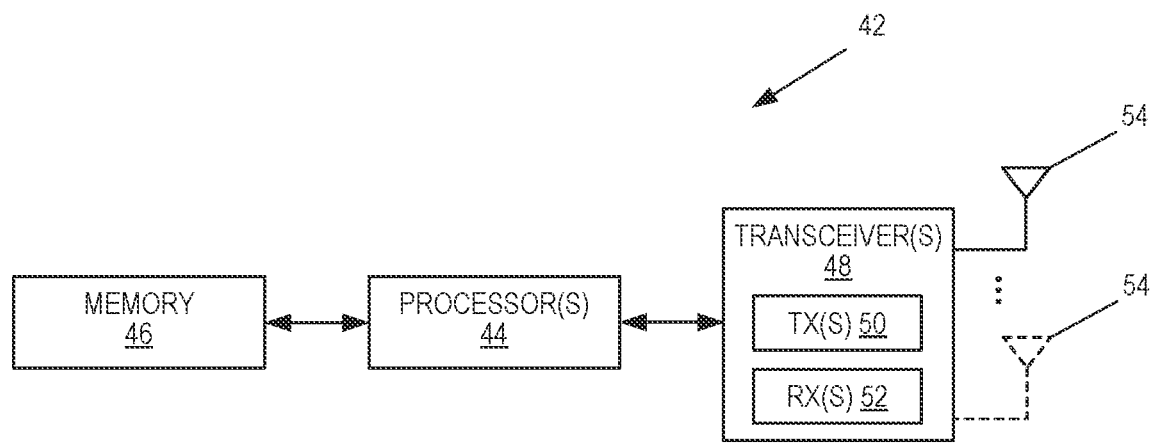
FIGS. 11 and 12 illustrate example embodiments of a UE.

FIG. 11 is a schematic block diagram of a UE 42 according to some embodiments of the present disclosure. As illustrated, the UE 42 includes one or more processors 44 (e.g., CPUs, ASICs, FPGAs, and/or the like), memory 46, and one or more transceivers 48 each including one or more transmitters 50 and one or more receivers 52 coupled to one or more antennas 54. In some embodiments, the functionality of the UE 42 described above may be fully or partially implemented in software that is, e.g., stored in the memory 46 and executed by the processor(s) 44.

In some embodiments, a computer program including instructions which, when executed by at least one processor, causes the at least one processor to carry out the functionality of the UE 42 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
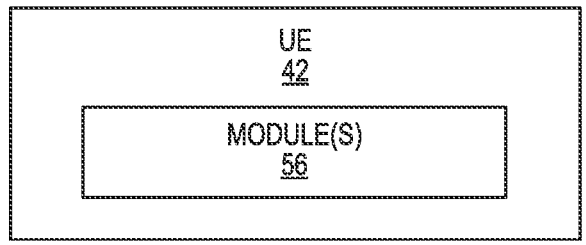

FIG. 12 is a schematic block diagram of the UE 42 according to some other embodiments of the present disclosure. The UE 42 includes one or more modules 56, each of which is implemented in software. The module(s) 56 provide the functionality of the UE 42 described herein.

Example Embodiments

While not being limited thereto, some example embodiments of the present disclosure are provided below.

1. A method of operation of a network node (10) to enable definition of an allowed area in which data services are provided to a wireless device (42), the allowed area having a size defined by one or more criteria comprising a predefined maximum number of tracking areas within the allowed area, comprising:
   upon attachment of the wireless device (42), accepting registrations of new tracking areas for the allowed area of the wireless device (42) as long as the one or more criteria that define the size of the allowed area are satisfied.
2. The method of embodiment 1 wherein accepting the registration comprises accepting a registration of a new tracking if the number of tracking areas already accepted for the allowed area of the wireless device (42) is less than the predefined maximum number of tracking areas within the allowed area.
3. The method of embodiment 1 or 2 further comprising rejecting a registration of a new tracking area if the number of tracking areas already accepted for the allowed areas of the wireless device (42) is greater than or equal to the predefined maximum number of tracking areas within the allowed area.
4. The method of any one of embodiments 1 to 3 further comprising, upon detachment of the wireless device (42), resetting the allowed area of the wireless device (42).
5. The method of any one of embodiments 1 to 3 further comprising, after detachment of the wireless device (42), resetting the allowed area of the wireless device (42) upon re-attachment of the wireless device (42).
6. The method of any one of embodiments 1 to 5 wherein a portion of the allowed area of the wireless device (42) is configured by a network operator.
7. The method of any one of embodiments 1 to 6 wherein a portion of the allowed area of the wireless device (42) is configured by a network node (10).
8. The method of any one of embodiments 1 to 7 wherein one or more tracking areas are added to the allowed area of the wireless device (42) by a network node (10).
9. The method of any one of embodiments 1 to 8 further comprising storing information regarding the allowed area of the wireless device (42).
10. The method of any one of embodiments 1 to 9 further comprising providing information regarding the allowed areas of the wireless device (42) to another network node (10).

11. A network node (10) that enables definition of an allowed area in which data services are provided to a wireless device (42), the allowed area having a size defined by one or more criteria comprising a predefined maximum number of tracking areas within the allowed area, the network node (10) adapted to:

upon attachment of the wireless device (42), accept registrations of new tracking areas for the allowed area of the wireless device (42) as long as the one or more criteria defining the size of the allowed criteria are satisfied.

12. The network node (10) of embodiment 11 wherein the network node (10) is further adapted to operate according to the method of any one of embodiments 2 to 10.

13. A network node (10) that enables definition of an allowed area in which data services are provided to a wireless device (42), the allowed area having a size defined by one or more criteria comprising a predefined maximum number of tracking areas within the allowed area, the network node (10) comprising:

at least one processor (14); and
memory (16) storing instructions executable by the at least one processor (14) whereby the network node (10) is operable to, upon attachment of the wireless device (42), accept registrations of new tracking areas for the allowed area of the wireless device (42) as long as the one or more criteria defining the size of the allowed criteria are satisfied.

14. A network node (10) that enables definition of an allowed area in which data services are provided to a wireless device (42), the allowed area having a size defined by one or more criteria comprising a predefined maximum number of tracking areas within the allowed area, the network node (10) comprising:

a registration processing module (40) operable to, upon attachment of the wireless device (42), accept registrations of new tracking areas for the allowed area of the wireless device (42) as long as the one or more criteria defining the size of the allowed criteria are satisfied.

The following acronyms are used throughout this disclosure.

3GPP Third Generation Partnership Project
5G Fifth Generation
AA Allowed Area
ASIC Application Specific Integrated Circuit
CC Core Control
CHF Connection Handling Function
CHF-C Control Handling Function Control Plane
CHF-U Control Handling Function User Plane
CN Core Network
CPU Central Processing Unit
DSL Digital Subscriber Line
EDGE Enhanced Data Rates for Global System for Mobile Communications
EIR Equipment Identity Register
eNB Enhanced or Evolved Node B
EPS Evolved Packet System
E-UTRAN Evolved Universal Terrestrial Radio Access Network
FPGA Field Programmable Gate Array
GERAN Global System for Mobile Communications/Enhanced Data Rates for Global System for Mobile Communications Radio Access Network
GPRS General Packet Radio Service
GSM Global System for Mobile Communications
HLR Home Location Register
HSS Home Subscriber Server
IoT Internet of Things
LTE Long Term Evolution
MME Mobility Management Entity
MT Mobile Terminating
MTC Machine Type Communication
NG Next Generation
O&M Operations and Management
PC Policy Control
PCRF Policy Charging Rules Function
PDN Packet Data Network
P-GW Packet Data Network Gateway
RAN Radio Access Network
SCEF Service Capability Exposure Function
SDM Subscriber Data Management
SGSN Serving General Packet Radio Service Support Node
S-GW Serving Gateway
TA Tracking Area
TAU Tracking Area Update
THF Traffic Handling Function
TR Technical Report
UE User Equipment
UTRAN Universal Terrestrial Radio Access Network
VPLMN Visited Public Land Mobile Network
WI Work Item Those skilled in the art will recognize improvements and modifications to the embodiments of the present disclosure. All such improvements and modifications are considered within the scope of the concepts disclosed herein.

The invention claimed is:

1. A method of operation of a core network Traffic Handling Function, THF, to enable definition of an allowed area in which data services are provided to a User Equipment, UE, the allowed area having a maximum size defined by one or more criteria indicating a predefined maximum number of tracking areas within the allowed area, the method being performed by the THF and comprises:

once the UE is attached, accepting registration of a new tracking area for the allowed area of the UE when the UE registers in the new tracking area, as long as the number of tracking areas already registered for the allowed area of the UE is less than the predefined maximum number of tracking areas within the allowed area.

2. The method of claim 1 further comprising rejecting a registration of a new tracking area if a number of tracking areas already accepted for the allowed area of the UE is greater than or equal to the predefined maximum number of tracking areas within the allowed area.

3. The method of claim 1 further comprising, upon detachment of the UE, resetting the allowed area of the UE.

4. The method of claim 1 further comprising, after detachment of the UE, resetting the allowed area of the UE upon re-attachment of the UE.

5. The method of claim 1 wherein a portion of the allowed area of the UE is configured by a network operator.

6. The method of claim 1 wherein a portion of the allowed area of the UE is configured by the THF.

7. The method of claim 1 wherein one or more tracking areas are added to the allowed area of the UE by the THF.

8. The method of claim 1 further comprising storing information regarding the allowed area of the UE.

9. The method of claim 1 further comprising providing information regarding the allowed area of the UE to another THF.

10. A core network Traffic Handling Function, THF, that enables definition of an allowed area in which data services are provided to a User Equipment, UE, the allowed area having a maximum size defined by one or more criteria indicating a predefined maximum number of tracking areas within the allowed area, the THF comprising:
- at least one processor; and memory storing instructions executable by the at least one processor whereby the THF is operable to:
- once the UE is attached, accept registration of a new tracking area for the allowed area of the UE when the UE registers in the new tracking area, as long as a number of tracking areas already registered for the allowed area of the UE is less than the predefined maximum number of tracking areas within the allowed area.

11. The THF of claim 10 wherein the THF is part of the control plane of the Core Network, CN.

12. The THF of claim 10 wherein the THF is further adapted to operatively: reject a registration of a new tracking area if the number of tracking areas already accepted for the allowed area of the UE is greater than or equal to the predefined maximum number of tracking areas within the allowed area.

13. The THF of claim 10 wherein the THF is further adapted to operatively: upon detachment of the UE, reset the allowed area of the UE.

14. The THF of claim 10 wherein the THF is further adapted to operatively: after detachment of the UE, reset the allowed area of the UE upon re-attachment of the UE.

15. The THF of claim 10 wherein a portion of the allowed area of the UE is configured by a network operator.

16. The THF of claim 10 wherein a portion of the allowed area of the UE is configured by the THF.

17. The THF of claim 10 wherein one or more tracking areas are added to the allowed area of the UE by the THF.

18. The THF of claim 10 wherein the THF is further adapted to operatively: store information regarding the allowed area of the UE.

19. The THF of claim 10 wherein the THF is further adapted to operatively: provide information regarding the allowed area of the UE to another THF.

* * * * *